United States Patent [19]

Oshiage et al.

[11] 4,399,802

[45] Aug. 23, 1983

[54] IGNITION ENERGY CONTROL METHOD AND SYSTEM

[75] Inventors: Katsunori Oshiage, Yokosuka; Akio Hosaka, Yokohama, both of Japan

[73] Assignee: Nissan Motor Company, Limited, Yokohama, Japan

[21] Appl. No.: 252,790

[22] Filed: Apr. 10, 1981

[30] Foreign Application Priority Data

Apr. 11, 1980 [JP] Japan .................................. 55-47578

[51] Int. Cl.$^3$ ............................................... F02P 3/04
[52] U.S. Cl. .................................... 123/609; 123/612; 123/620; 123/417; 123/425
[58] Field of Search ................ 123/414, 416, 417, 617, 123/620, 609, 425

[56] References Cited

U.S. PATENT DOCUMENTS

| 3,807,378 | 4/1974 | Wernet, Jr. | 123/613 |
|---|---|---|---|
| 4,183,340 | 1/1980 | Gilbert | 123/620 |
| 4,231,332 | 11/1980 | Wrathall | 123/609 |
| 4,253,443 | 3/1981 | Seeger et al. | 123/609 |
| 4,267,813 | 5/1981 | Hohne et al. | 123/609 |
| 4,282,573 | 8/1981 | Imai et al. | 123/417 |
| 4,293,814 | 10/1981 | Boyer | 123/612 |
| 4,303,977 | 12/1981 | Kobashi et al. | 123/416 |
| 4,309,973 | 1/1982 | Tamura | 123/609 |

FOREIGN PATENT DOCUMENTS

| 28899 | 5/1981 | European Pat. Off. | |
|---|---|---|---|
| 55-5469 | 1/1980 | Japan | 123/425 |
| 56-38562 | 4/1981 | Japan | 123/417 |
| 1052245 | 12/1966 | United Kingdom . | |
| 1088791 | 10/1967 | United Kingdom . | |
| 1196378 | 6/1970 | United Kingdom . | |
| 1468325 | 3/1977 | United Kingdom . | |
| 1476887 | 6/1977 | United Kingdom . | |
| 1498066 | 1/1978 | United Kingdom . | |
| 1501621 | 2/1978 | United Kingdom . | |
| 1516301 | 7/1978 | United Kingdom . | |
| 1571934 | 7/1980 | United Kingdom . | |
| 2069044 | 8/1981 | United Kingdom . | |
| 2076892 | 12/1981 | United Kingdom . | |
| 2087483 | 5/1982 | United Kingdom . | |

Primary Examiner—Parshotam S. Lall
Attorney, Agent, or Firm—Schwartz, Jeffery, Schwaab, Mack, Blumenthal & Koch

[57] ABSTRACT

An ignition energy control method and system such that a high ignition energy is supplied to the spark plugs only while the engine is operating under an unstable condition. The unstable engine operating condition is determined by detecting the difference in the maximum engine speed within a predetermined crankshaft revolution angle or by detecting the low-frequency vibration generated by the engine. The ignition energy is controlled by calculating an appropriate pulse-width of an ignition signal or by changing a high voltage generating plasma within the cylinders. The ignition energy control system according to the present invention comprises a crankshaft angle sensor or a low-frequency vibration sensor, a calculating and storing means, and an ignition system including a plasma generating power supply where necessary.

24 Claims, 11 Drawing Figures

FIG. I
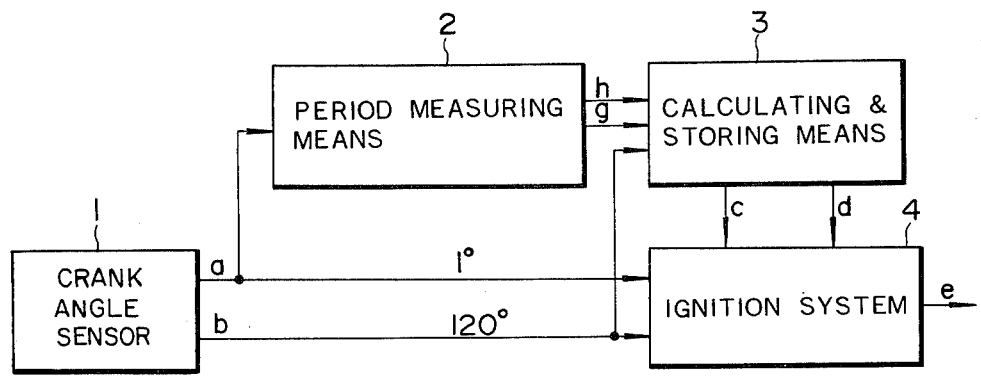
FIG. 2
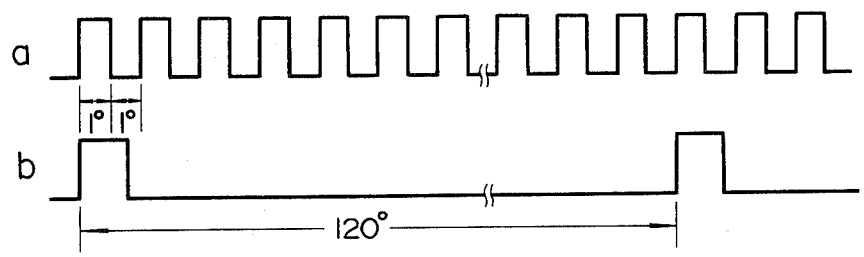
FIG. 3
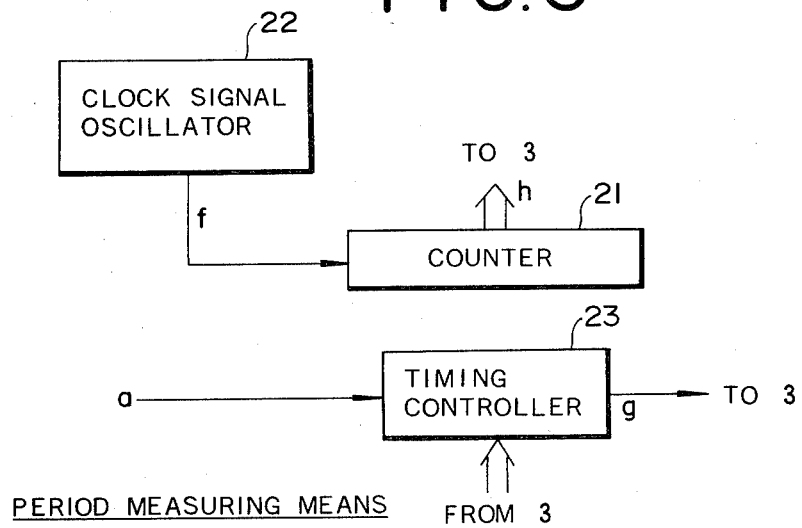
PERIOD MEASURING MEANS

HIGH ENERGY IGNITOR

IGNITION ENERGY CONTROL METHOD AND SYSTEM

BACKGROUND OF THE INVENTION

1. Field of the Invention

The invention relates to an ignition energy control method and system, and more particularly to the method and system such that high ignition energy is supplied to the spark plugs only while the engine is operating under an unstable condition.

2. Description of the Prior Art

It has well been known that a diluted fuel combustion (diluted mixture of fuel and air as used for an engine) is preferable in order to improve the fuel consumption rate. However, when a diluted fuel combustion is used, the mixture is not stably ignited, thereby resulting in an unstable engine operating condition.

To overcome this problem, there exists a high energy ignition systems have been developed. For this high energy ignition system, there have been published various systems, such as for instance, a system to combine the use of the ordinary ignition means with a plasma ignition means.

In the conventional high-energy ignition system, however, since the system is configured that high energy is supplied to the spark plugs at all times to ensure good ignition even under the worst engine operating conditions, high energy ignition is performed even under engine operating conditions where no high energy ignition is required. Accordingly, an overload is always applied to the battery, generator, etc., and additionally an excessive load is also applied to the engine itself, thus causing problems such as the worsening of the fuel consumption rate and the wear of the ignition system.

SUMMARY OF THE INVENTION

With these problems in mind, therefore, it is the primary object of the present invention to provide an ignition energy control method and system such that an unstable engine operating condition is determined, and high energy is supplied to the ignition plugs only when the engine is unstable.

To achieve the above-mentioned object, the ignition energy control system according to the present invention comprises a crankshaft angle sensor, a period measuring means, a calculating and storing means, and a high energy ignition system including a plasma generating power supply.

In the ignition energy control system according to the present invention thus configured, since the engine operating condition is being checked constantly and high energy is supplied to the spark plugs only when the engine is operating under an unstable condition, it is possible to save energy, to reduce the load applied to the battery and generator, and to improve the durability of the spark plugs.

BRIEF DESCRIPTION OF THE DRAWINGS

The features and advantages of the ignition energy control method and system according to the present invention will be more clearly appreciated from the following description taken in conjunction with the accompanying drawings in which like reference numerals designate corresponding elements and in which:

FIG. 1 is a schematic block diagram showing an embodiment of the present invention;

FIG. 2 depicts waveform diagrams showing the output pulse signals generated from the crankshaft angle sensor, a indicating a one-degree pulse signal and b indicating a 120° pulse signal;

FIG. 3 is a schematic block diagram showing a sample configuration of the period measuring means;

DETAILED DESCRIPTION OF THE PREFERRED EMBODIMENTS

Figure 4:
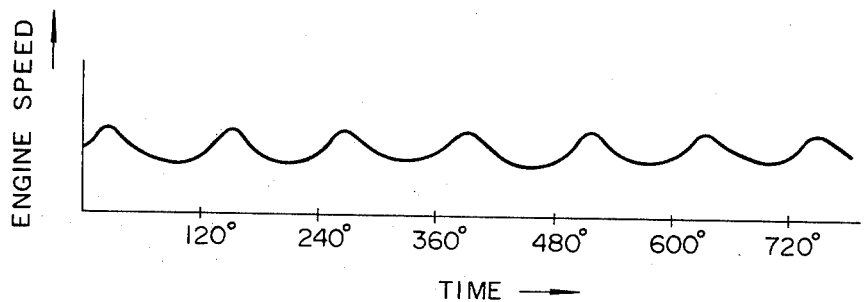
FIG. 4 is a graphical representation showing the engine speed with respect to time in a stable operating condition.

Reference is made to the accompanying drawings, in which is shown a first embodiment of the present invention.

FIG. 1 shows a schematic block diagram of an embodiment according to the present invention.

The ignition energy control system of FIG. 1 comprises a crankshaft angle sensor 1 generating pulse signals a and b for each predetermined amount of crankshaft revolution, a period measuring means 2 measuring the period of the pulse signal a to output a period signal h, a calculating and storing means 3 (having a microcomputer, a random access memory (RAM), and read-only memory (ROM)), and an ignition system 4 generating an ignition signal e depending upon the pulse signals a and b outputted from the crankshaft angle sensor 1 and the pulse signals c and d outputted from the calculating and storing means 3.

For the crankshaft angle sensor 1, there may be employed various devices such as a combination of an electromagnetic pickup and a set of gears, a combination of light-emitting/light-receiving elements and a disk with a slit, a combination of a magnet sensitve element and a magnetized disk, etc.

FIG. 2 shows the waveform diagrams of the pulse signals a and b when the present invention is applied to a six-cylinder engine. The signal a changes every one-degree of crankshaft revolution, and the single pulse signal b is emitted every 120° of crankshaft revolution.

FIG. 3 is a schematic block diagram showing a sample configuration of the period measuring means 2. The period measuring means 2 comprises a counter 21 for counting a clock signal f sent from the clock signal oscillator 22 and sending the count signal h indicative of the number of clock signals f to the calculating and storing means 3, and a timing controller 23 for generating an interrupt request signal g to the calculating and storing means 3 in synchronization with the pulse signal a.

When the interrupt request signal g is inputted from the timing controller 23, the calculating and storing means 3 reads the count signal h from the counter 21, stores it, and calculates the difference between the value previously stored and the value currently stored to obtain a period data. Since the period data is a reciprocal of the engine speed, it is possible to obtain the instantaneous value of the engine speed in dependence thereupon.

The calculating and storing means 3 stores the measured period data, executes the arithmetic operation on the data to obtain the engine speed, determines the rate of change in the engine speed to output a signal c to determine the period during which a current is passed through the ignition coil, and further outputs a signal d to determine the ignition timing.

Figure 5:
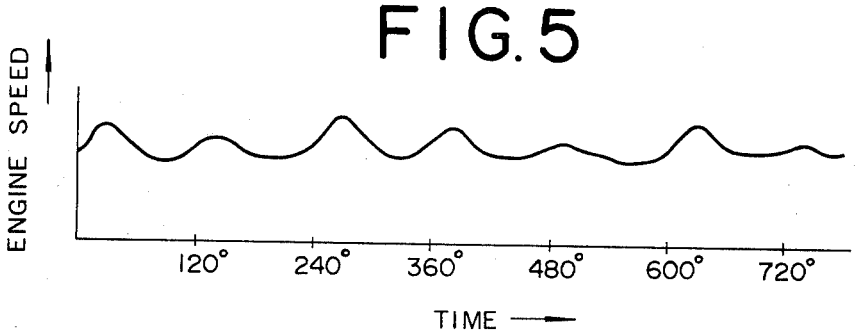
FIG. 5 is another graphical representation showing the engine speed with respect to time in a unstable operating condition.

FIG. 4 shows the rate of change of engine speed with respect to time when the engine is operating in a stable condition; FIG. 5 shows the rate of change of engine speed when the engine is operating in an unstable condition. In these figures, the ignition timing of a six-cylinder engine is represented by the crankshaft angle on the abscissa corresponding also to the time elapsed.

In a stable engine operating condition, the maximum engine speed is regularly repeated for each ignition timing at almost constant intervals; however, in an unstable engine operating condition, the maximum engine speed becomes irregular since the ignition state of the air-fuel mixture differs for each ignition.

Figure 6:
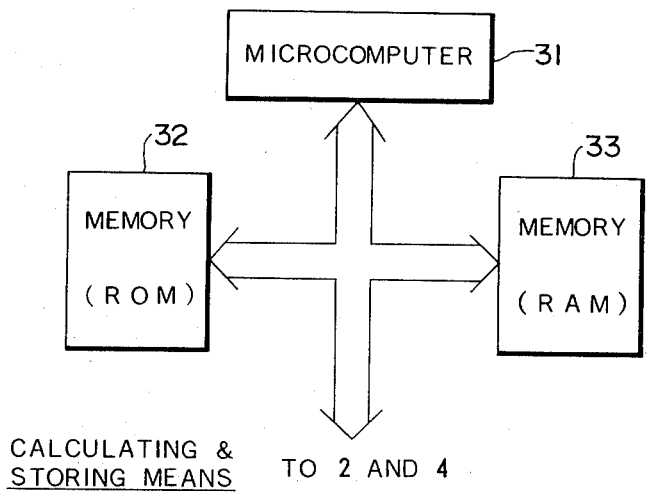
FIG. 6 is a schematic block diagram showing a sample configuration of the calculating and storing means.

FIG. 6 is a schematic block diagram showing a sample configuration of the calculating and storing means 3. When the request signal g is inputted from the period measuring means 2, the microcomputer 31 operates in accordance with a program previously stored in the ROM 32 and executes arithmetic operations on the data signal temporarily stored in the RAM 33 and the other input data.

FIG. 7 depicts flowcharts showing the operations of the microcomputer 31. In accordance with the flowcharts, there are explained hereinbelow the operations of the calculating and storing means 3.

Figure 7A:
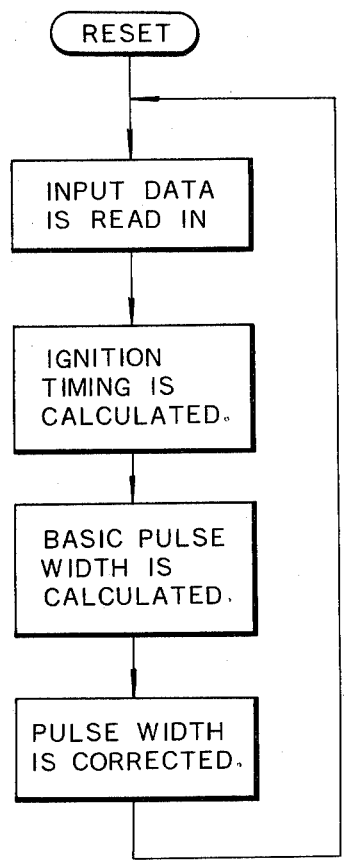
FIGS. 7A-7C depict flowcharts showing the operation of the calculating and storing means.

As shown in FIG. 7(A), when the power supply is turned on, the operation immediately starts from "RESET", and various input data are read thereinto in order to perform the ordinary ignition timing control of the engine. The input data, not shown in FIG. 1, are various signals to indicate engine operating conditions such as intake air flow rate, exhaust pressure, throttle opening angle, engine coolant temperature, intake air temperature, battery voltage etc.

The ignition timing is determined from these data. First the basic ignition timing is calculated from the measured engine speed and the data indicating the engine load. Next, the ignition timing is corrected by reference to the coolant temperature and intake air temperature. After these operations, the pulse width of the primary current passed through the ignition coil is calculated by reference to these data. The most updated data are stored in the RAM 33 of the calculating and storing means 3 by performing the above-mentioned calculations repeatedly.

Next a detailed description will be made of the method of determining stable or unstable engine operating conditions. As described already, the period of the pulse signal a is constantly measured in dependence upon the count signal h from the period measuring means 2, the period data are obtained when the microcomputer 31 executes the interrupt process program which is called out in accordance with the interrupt request signal g generated every degree of crankshaft revolution angle from the timing controller 23 shown in FIG. 3.

Figure 7B:
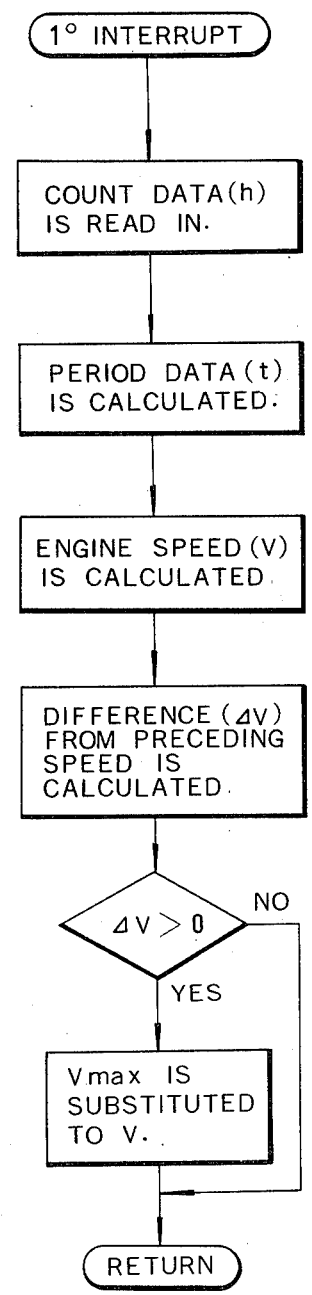

When this one-degree interrupt request signal g is generated, the microcomputer 31 which is executing the arithmetical process shown in FIG. 7(A) interrupts the process temporarily and executes the arithmetical process shown in FIG. 7(B) beginning from the step labeled "one-degree interrupt".

First the count data signal h in the counter 21 is read. Next, the period t of the signal a from its leading edge to its trailing edge or vice versa is calculated based on the current count data and the preceding count data read thereinto in the preceding read-in operation. After that, the engine speed V which is the reciprocal of the period t is calculated and stored. Next the difference $\Delta V$ in the engine speed V between the current value and the preceding value is calculated.

In the case when this difference $\Delta V$ is positive, that is, when the engine speed V has increased, the latest engine speed V is substituted for the maximum engine speed Vmax. In contrast with this, in the case when the difference is zero or negative, that is, when the engine speed V has decreased or not changed, nothing is performed.

When the above-mentioned arithmetical process in FIG. 7(B) has been completed, the arithmetic process in FIG. 7(A) which has been interrupted by the one-degree interrupt request signal g is restarted.

Figure 7C:
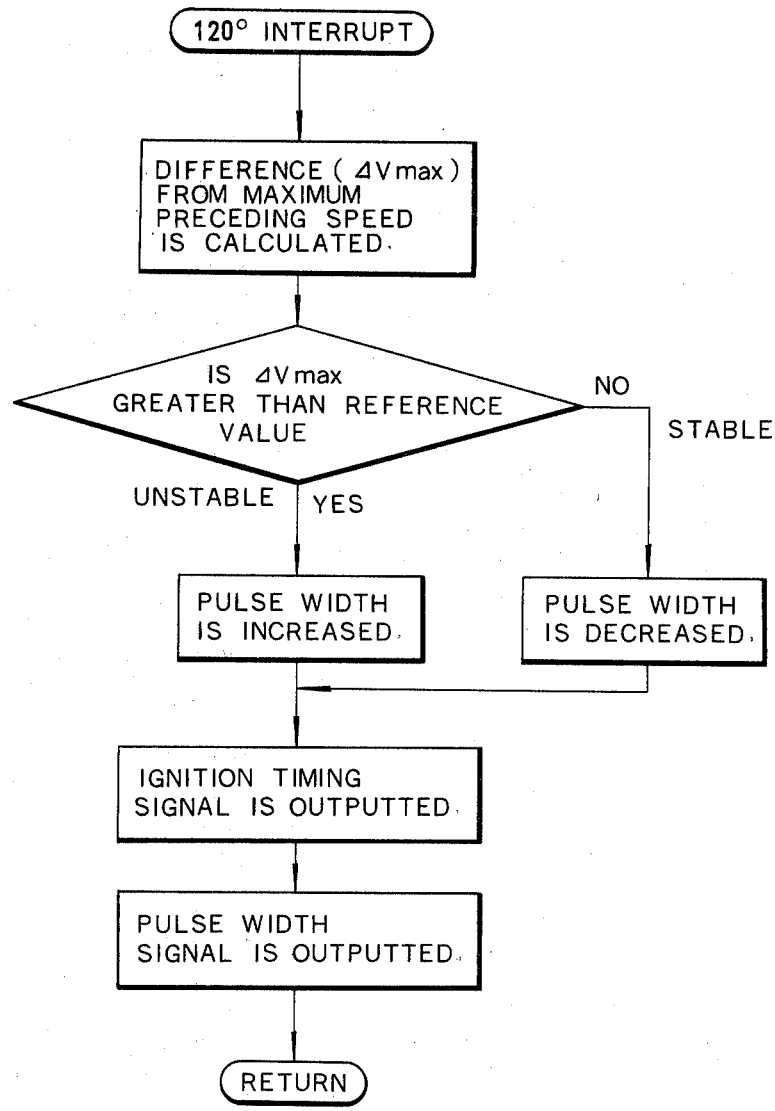

When the pulse signal b, that is the signal generated every 120° of crankshaft revolution angle, is inputted to the microcomputer, the arithmetical process starts from the step labeled "120° interrupt" in FIG. 7(C), in the same manner as that of the step labeled "1° interrupt."

First, the difference $\Delta V$max is calculated being the difference between Vmax calculated by the one-degree interrupt and Vmax used by the preceding 120-degree interrupt.

This difference $\Delta V$max is compared with a predetermined reference value. When this $\Delta V$max is greater than the reference value, the engine is determined to be in an unstable operating condition, and an appropriate correction is performed to increase the pulse width already calculated by the arithmetical process beginning from "RESET" in FIG. 7(A) in order to increase the ignition energy.

In contrast with this, when the difference $\Delta V$max is smaller than the reference value, the engine is determined to be in a stable operating condition, and the corrected results are gradually returned to their previous value. When the correction is completely returned, the pulse width data without any correction is outputted.

This pulse width is termed a dwell angle indicating the period of time during which the primary current is passed through the ignition coil in terms of angle of crankshaft revolution. Of course, the more the pulse width, the more the primary current increases, and therefore the more the secondary voltage increases, thus increasing the ignition energy.

Since they are well known, the descriptions of the operations of the data (pulse-width setting signal c and ignition timing setting signal d) outputted from the calculating and storing means 3, and the ignition system 4 outputting the ignition signal e in response to the pulse signals a and b outputted from the crankshaft angle sensor 1, are omitted herein.

The basic embodiment of the present invention has been described hereinabove, and the other preferred embodiment of the present invention will be described hereinbelow.

When this invention is applied to an engine other than a six-cylinder engine, it is only necessary to change the pulse signal b. For instance, this pulse is generated every 180° of crankshaft revolution angle in the case of an four-cylinder engine, and every 90° (720°/8 cylinders) in the case of an eight-cylinder engine.

It is not necessary to measure the period every degree of crankshaft revolution. For instance, it is possible to use a pulse signal a which is initiated every two degrees of crankshaft revolution, and again to measure the period of the pulse signal a from the leading edge to the next trailing edge.

Further, it is possible to calculate the engine speed V from every second measured result in the arithmetical process.

Further, without using the arithmetic operations of "one-degree interrupt", it is possible to use the speed calculated from the period of 120° signal in place of the maximum revolution speed Vmax. When the period is long, as in this case, there are advantages such that it is possible to use a low-priced microcomputer with its peripheral devices which have a slow arithmetical process speed.

Regarding the determination of the stable or unstable engine operating condition, it is possible to determine it more accurately by changing the reference value in accordance with the engine operating conditions. For instance, when the engine speed is low, the rate of change of the maximum engine speed due to unstable engine operating conditions is small in absolute value; however, when the engine speed is high, the rate of change of the maximum engine speed becomes large in absolute value. Therefore, it is preferable to change the reference value in accordance with the engine speed.

Further, in this embodiment it is also possible to change the reference value in accordance with factors other than engine speed, such as coolant temperature, engine load, vehicle speed, etc.

Further, it is possible to determine more accurately the stable or unstable engine operating condition by calculating the minimum engine speed Vmin and the difference $\Delta$(Vmax-Vmin) between the maximum engine speed and the minimum engine speed, without depending only upon the difference $\Delta$Vmax between consecutive maximum engine speeds.

Furthermore, it is possible to correct the pulse width in accordance with the stable or unstable engine operating condition by reducing the pulse width in the case of a stable condition, by increasing the pulse width suddenly once the engine operating condition is determined to be unstable and afterwards decreasing the pulse width gradually, or by increasing or decreasing the pulse width based on proportional integration.

Next, there is explained hereinbelow the method of controlling ignition energy by using plasma.

Figure 8:
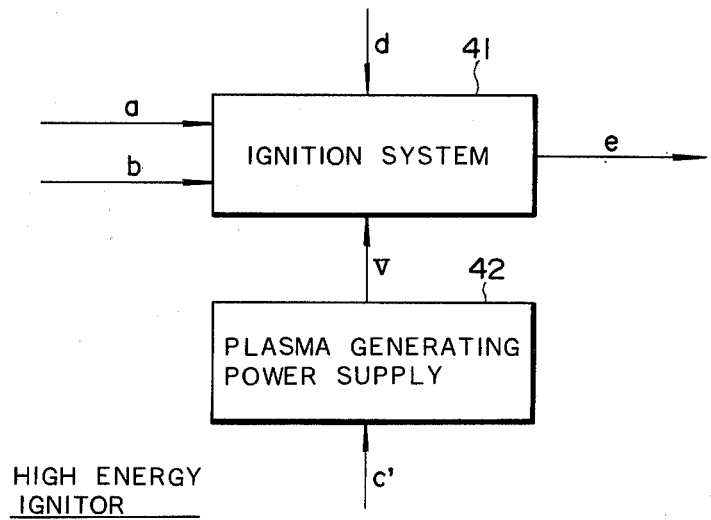
FIG. 8 is a schematic block diagram showing the essential units of the high energy ignition system used with the present invention.

FIG. 8 shows a schematic block diagram of an embodiment according to the present invention, where the ignition energy control system comprises an ordinary ignition system 41 and a plasma generating power supply 42 as a high-energy ignition means.

The ordinary ignition system 41 outputs an ignition signal e to the engine in response to the pulse signals a and b generated from the angle sensor 1 and the ignition timing presetting signal d generated from the calculating and storing means 3.

The plasma generating power supply 42 supplies a high voltage of 2,000 to 3,000 V to the plugs in order to realize a plasma state within the engine cylinders after the high-tension discharge ignition induced by the ignition system 41.

The calculating and storing means 3 outputs a voltage control signal c' to the plasma generating power supply 42, in place of the above-mentioned pulse-width setting signal c, in order to control the power supply 42.

In the same way as in the pulse-width setting signal c, the voltage control signal c' increases the ignition energy supplied from the plasma generating power supply 42 to the ignition system 41 in an unstable engine operating condition, that is, the output voltage V from the plasma generating power supply 42 is increased.

In contrast with this, in a stable engine operating condition, the output voltage V is decreased to decrease the ignition energy.

Further, regarding the method of controlling the plasma generating power supply 42 by the voltage control signal c', it is possible to change the ignition energy of the plasma by turning the power supply on or off.

Figure 9:
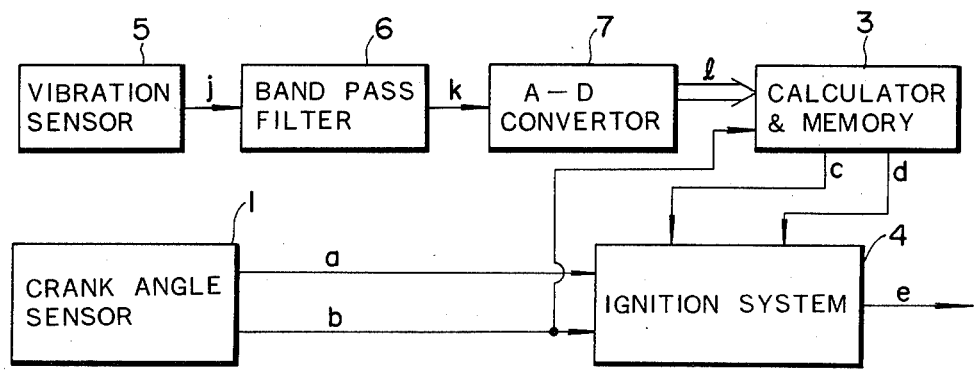
FIG. 9 is a schematic block diagram of another embodiment according to the present invention.

Next, there is explained hereinbelow another embodiment in which a vibration sensor determines the stable or unstable engine operating condition. FIG. 9 shows a schematic block diagram of the embodiment.

When the engine operating condition becomes unstable, the fuel combustion becomes irregular and the engine speed changes, accompanied by relatively low-frequency vibration. This embodiment comprises a vibration sensor 5, a band pass filter 6 separating the vibration caused by irregular fuel combustion from the output signals j from the vibration sensor 5, and an A-D convertor 7 converting the output signal k from the band pass filter 6 from analog form to a digital value. In this case, the digital signal l outputted from the A-D converter 7 is sent to the calculating and storing means 3.

As the method of determining the stable or unstable engine operating condition, there are various methods such as detecting the peak-to-peak value of the vibration and comparing it with the reference value, or detecting the mean vibration signal and comparing it with the reference value. In this case, it is also preferable and more accurate to correct the reference value in accordance with such engine operating conditions as engine load, engine speed, coolant temperature, intake air temperature, intake air flow rate, intake air pressure, throttle opening angle, battery voltage, etc.

Further, in the case where a resonant-type vibration sensor is used for the vibration sensor 5, the band pass filter 6 is unnecessary. In this embodiment, the ignition energy control is performed in the same manner as described in the other embodiment previously explained hereinabove, depending upon the determined result of stable or unstable engine operating condition.

As described hereinabove, in the ignition energy controller according to the present invention, since the engine operating condition is checked and a high energy is applied to the spark plugs only when the condition is unstable, it is possible to save energy, to reduce the load applied to the battery and generator, to improve the operating conditions of the vehicle and the fuel consumption rate, and additionally the durability of the ignition system, because high energy is applied to the ignition coil only when high energy ignition is necessary.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A method of controlling ignition energy supplied to an engine, which comprises the following steps of:
   (a) detecting the current engine load and the current engine speed every predetermined time period;
   (b) determing the current ignition timing in accordance with the detected current engine load and engine speed;
   (c) calculating the current basic ignition energy to be applied to the engine in accordance with the current detected engine speed;
   (d) storing the determined current ignition timing and the calculated current basic ignition energy in a memory unit periodically updating same;
   (e) detecting the current instantaneous change in engine speed;
   (f) comparing the detected instantaneous change in engine speed with a reference value;
   (g) correcting the calculated basic ignition energy so as to be increased when the detected instantaneous change in engine speed exceeds the reference value and decreased when the detected instantaneous change in engine speed is lower than the reference value, whereby ignition energy can be controlled in accordance with the instantaneous change in engine speed.

2. A method of controlling ignition energy as set forth in claim 1, wherein the steps of detecting the current instantaneous change in engine speed comprises the following steps of:
   (a) counting a clock signal f and reading the count signal h representative of the number of clock signals f;
   (b) calculating the current period t of a pulse signal a generated whenever a crankshaft of the engine rotates through a first predetermined angle in dependence upon the read count signal h;
   (c) calculating the current instantaneous engine speed V on the basis of the calculated period t;
   (d) calculating the difference between the calculated current engine speed and the calculated preceding engine speed;
   (e) substituting the current engine speed for the preceding engine speed when the difference therebetween is positive and not substituting the current engine speed for the preceding engine speed when the difference is negative, thereby obtaining a current maximum engine speed;
   (f) storing the current maximum engine speed in a memory unit; and
   (g) calculating the difference between the current maximum engine speed and the preceding maximum engine speed whenever the crankshaft rotates through a second predetermined angle larger than the first predetermined angle to obtain the instantaneous change in engine speed on the basis of the difference between the two maximum engine speeds.

3. A method of controlling ignition energy as set forth in claim 2, wherein in the step of calculating the current period t, the current period t of the pulse signal is counted for each pulse signal a.

4. A method of controlling ignition energy as set forth in claim 2, wherein in the step of calculating the current period t, the current period of the pulse signal is counted on the basis of several pulse signals a as a mean period.

5. A method of controlling ignition energy as set forth in claim 2, wherein in the step of calculating the difference between the current maximum engine speed value and the preceding maximum engine speed value, the instantaneous change in engine speed is determined by calculating the minimum engine speed additionally and by calculating the difference between the maximum engine speed and the minimum engine speed.

6. A method of controlling ignition energy as set forth in claim 1, wherein the steps of detecting the current instantaneous change in engine speed comprises the following steps of:
   (a) detecting a low-frequency vibration generated by the engine and generating an analog electrical signal corresponding thereto;
   (b) converting the analog vibration signals from analog to digital form to obtain the current instantaneous change in engine speed on the basis of the changes in the converted digital signal value.

7. A method of controlling ignition energy as set forth in claim 6, wherein the instantaneous change in engine speed is determined by comparing peak values of the detected low-frequency vibration signals with a reference value.

8. A method of controlling ignition energy as set forth in claim 6, wherein the instantaneous change in engine speed is determined by comparing the mean value of the detected low-frequency vibration signals with a reference value.

9. A method of controlling ignition energy as set forth in claim 1, wherein the step of correcting the calculated basic ignition energy includes the step of correcting the basic pulse width of ignition signals passed through ignition coils of said engine.

10. A method of controlling ignition energy as set forth in claim 1, wherein the step of correcting the calculated basic ignition energy includes the step of correcting the plasma generating voltage supplied from a plasma-generating power supply, a high energy of plasma being supplied to cylinders through spark plugs after a high-tension discharge ignition.

11. A method of controlling ignition energy as set forth in claim 1, wherein in the step of comparing the detected instantaneous change in engine speed with a reference value, the reference value is changed according to engine operating conditions.

12. A method of controlling ignition energy as set forth in claim 1, wherein in the step of comparing the detected instantaneous change in engine speed with a reference value, the reference value is changed according to coolant temperature.

13. A method of controlling ignition energy as set forth in claim 1, wherein in the step of comparing the detected instantaneous change in engine speed with a reference value, the reference value is changed according to engine load.

14. A method of controlling ignition energy as set forth in claim 1, wherein in the step of comparing the detected instantaneous change in engine speed with a reference value, the reference value is changed according to engine speed.

15. A system for controlling ignition energy supplied to an engine, which comprises:
   (a) a crankshaft angle sensor for generating a first pulse signal a whenever a crankshaft for the engine rotates through a first predetermined angle and a second pulse signal b whenever the crankshaft rotates through a second predetermined angle larger than the first predetermined angle;

(b) a period measuring means connected to said angle sensor and provided with a clock signal generator for outputting a count signal h indicative of the number of clock signals f and for generating an interrupt request signal g for each first predetermined crankshaft angle;

(c) a calculating and storing means connected to said angle sensor and said period measuring means and provided with a microcomputer for reading the count signal h, calculating the current period t of the first pulse signal a in dependence upon the read count signal h, calculating the current instantaneous engine speed V on the basis of the calculated period t, calculating the difference between the calculated current engine speed and the calculated preceding engine speed, substituting the current engine speed for the preceding engine speed when the difference is positive and not substituting the current engine speed for the preceding engine speed when the difference is negative thereby obtaining a current maximum engine speed, storing the current maximum engine speed, calculating the difference between the current maximum engine speed and the preceding maximum engine speed whenever the crankshaft rotates through the second predetermined angle to obtain the instantaneous change in engine speed on the basis of the difference between the two maximum engine speeds, comparing the calculated instantaneous change in engine speed with a reference value, detecting the current engine load, determining the current ignition timing in accordance with the detected engine load and calculated engine speed, calculating the current basic ignition energy to be supplied to the engine in accordance with the detected engine speed, correcting the calculated basic ignition energy so as to be increased when the calculated instantaneous change in engine speed exceeds the reference value and decreased when the detected instantaneous change in engine speed is lower than the reference value, and outputting the determined ignition timing signal d and the corrected ignition energy signal c; and (d) an ignition system connected to said crankshaft angle sensor and said calculating and storing means for outputting an ignition signal e to ignition plugs of the engine in response to the pulse signals a and b, the ignition timing signal d and the ignition energy signal c.

16. A system for controlling ignition energy supplied to an engine as set forth in claim 15, which further comprises a plasma generating power supply connected to said ignition system and said calculating and storing means for supplying a high voltage for generating plasma within cylinders through spark plugs after a high-tension discharge ignition, said plasma generating power supply being controlled by an ignition energy signal from said calculating and storing means.

17. A system for controlling ignition energy supplied to an engine as set forth in claim 15, wherein said period measuring means comprises:

(a) a clock oscillator for generating a reference clock pulse signal f as a standard time signal;

(b) a counter connected to said clock oscillator for counting the clock pulses generated from said clock oscillator and outputting a count signal h indicative of the number of the counted clock signals f; and (c) a timing controller for receiving the pulse signal a generated from said crankshaft angle sensor and outputting an interrupt request signal g in synchronization with the pulse signal a to execute a program for controlling operation of said microcomputer for calculating an instantaneous change in engine speed.

18. A system for controlling ignition energy as set forth in claim 15, wherein the first pulse signal a is generated every degree of crankshaft revolution.

19. A system for controlling ignition energy as set forth in claim 15, wherein the first pulse signal a is generated every two degrees of crankshaft revolution.

20. A system for controlling ignition energy as set forth in claim 15, wherein the second pulse signal b is generated every 120 degrees of crankshaft revolution in the case of a six-cylinder engine.

21. A system for controlling ignition energy as set forth in claim 15, wherein the second pulse signal b is generated every 180 degrees of crankshaft revolution in the case of a four-cylinder engine.

22. A system for controlling ignition energy as set forth in claim 15, wherein the second pulse signal be is generated every 90 degrees of crankshaft revolution in the case of an eight-cylinder engine.

23. A system for controlling ignition energy supplied to an engine, which comprises:

(a) a crankshaft angle sensor for generating a first pulse signal a whenever a crankshaft for the engine rotates through a first predetermined angle and a second pulse signal b whenever the crankshaft rotates through a second predetermined angle larger than the first predetermined angle;

(b) a vibration sensor for detecting low-frequency vibration generated by the engine generating analog electrical signals j corresponding thereto;

(c) a band-pass filter connected to said sensor for filtering the low-frequency vibration signals and outputting signals k corresponding thereto;

(d) an analog-to-digital converter connected to said band-pass filter for converting the filtered vibration signals from analog to digital form and outputting signals l corresponding thereto;

(e) a calculating and storing means connected to said analog-to-digital converter and said crankshaft angle sensor and provided with a microcomputer for reading and storing the converted signals l, and comparing the converted signals l with a reference value;

(f) detecting the current engine load, determining the current ignition timing in accordance with detected engine load and calculated engine speed, calculating the current basic ignition energy to be supplied to the engine in accordance with the detected engine speed, correcting the converted basic ignition energy so as to be increased when the converted signals l indicative of instantaneous change in engine speed exceeds the reference value and decreased when the converted signals l is lower than the reference value, and outputting the determined ignition timing signal d and the corrected ignition energy signal c; and (g) an ignition system connected to said crankshaft angle sensor and said calculating and storing means for outputting an ignition signal e to ignition plugs of the engine in response to the pulse signals a and b, the ignition timing signal d and the ignition energy signal c.

24. A system for controlling ignition energy as set forth in claim 23, wherein a resonant-type vibration sensor is used for said vibration sensor.

* * * * *